United States Patent [19]
Crane et al.

[11] 4,107,980
[45] Aug. 22, 1978

[54] ASSESSMENT OF FLAW GROWTH POTENTIAL IN STRUCTURAL COMPONENTS

[75] Inventors: Robert L. Crane, Kettering; Alten F. Grandt, Jr., Dayton; Joseph P. Gallagher, Bellbrook, all of Ohio

[73] Assignee: The United States of America as represented by the Secretary of the Air Force, Washington, D.C.

[21] Appl. No.: 804,483
[22] Filed: Jun. 7, 1977
[51] Int. Cl.² ............................................. G01B 5/30
[52] U.S. Cl. ................................................... 73/88 R
[58] Field of Search ................................ 73/88 R, 91

[56] References Cited
U.S. PATENT DOCUMENTS

| | | | |
|---|---|---|---|
| 3,136,154 | 6/1964 | Christensen | 73/88 R |
| 3,774,443 | 11/1973 | Green et al. | 73/88 R |
| 3,979,949 | 9/1976 | Smith | 73/88 R |

*Primary Examiner*—Anthony V. Ciarlante
*Attorney, Agent, or Firm*—Joseph E. Rusz; Cedric H. Kuhn

[57] ABSTRACT

A method for predicting damage accumulation in a structural component in which a gage in the form of a metal strip having a flaw therein of predetermined length is attached to the component having a flaw therein of a length assumed to be greater than the length of any other flaw therein. Damage accumulation in the structural component is tracked by following the growth of the flaw in the gage and determining from that growth the growth in the flaw in the component. Thus, in accordance with this method, flaw growth in a gage is related to flaw growth in a structural component rather than to time so that damage actually accumulated in the component can be predicted regardless of the time factor.

12 Claims, 6 Drawing Figures

ASSESSMENT OF FLAW GROWTH POTENTIAL IN STRUCTURAL COMPONENTS

RIGHTS OF THE GOVERNMENT

The invention described herein may be manufactured and used by or for the Government of the United States for all governmental purposes without the payment of any royalty.

FIELD OF THE INVENTION

This invention relates to a method for assessing flaw growth potential in structural components. In one aspect it relates to a flaw or crack growth gage for assessing flaw growth potential in structural components.

BACKGROUND OF THE INVENTION

Regardless of the techniques followed or the care taken in fabricating structural components, they still contain flaws which usually take the form of cracks. In pipelines, for example, the flaws may be present in the welds which join pipe sections. The problem associated with flaws or cracks is especially pronounced in aircraft structural materials. The flaws of greatest significance in aircraft structural components are those emanating from the multitude of fastener holes that are drilled in the various components. These components are subjected to rigorous inspections, and specifications place a limit on the maximum length that a flaw may have.

The flaws in aircraft structural components grow as a result of the effects of fatigue or service loading as well as exposure to diverse environmental conditions. The growth of even one flaw beyond a predetermined limit can threaten the integrity of the entire aircraft. A great deal of research work has been directed toward the development of techniques, procedures and instruments to assess structural damage accumulation. The many instruments that have been developed to facilitate damage accumulation tracking are commonly referred to as fatigue gages. These gages have been generally unsuccessful since it has not been possible to relate the gage response to accumulation of structural damage. In U.S. Pat. No. 3,979,949, a fatigue gage is disclosed that falls in this latter category. The gage consists of a rectangular metal strip having a slit therein and a strip of parting material of uniform width attached to the undersurface of the strip and centered on the slit. The gage is attached to a structural member, and changes in the slit length is measured as a function of time. There is no correlation between slit growth and the growth of a defect in the structure. In other words, the method disclosed in the patent does not provide a solution to the problem of predicting the growth of potential preexisting flaws in structural components.

The method currently in use for solving the above-mentioned problem involves the attachement of load sensing elements to an aircraft. The sensing elements count the number of times that a particular component experiences an acceleration that exceeds a specific value. These data are tabulated and used as input to mathematical models which predict flaw growth. This method is inaccurate because of many factors. For example, the loading or acceleration data must be carefully taken from the operational aircraft and accurately entered into a computer memory. Considering the likely chances for error in performing these steps, there is very little confidence in the reliability of these data. Furthermore, the mathematical models used to predict flaw growth from loading data are inaccurate.

It is a principal object of this invention, therefore, to provide a method for predicting damage accumulation in a specific structural component based on the service that it has experienced while eliminating the inaccurate steps of the prior art methods.

Another object of the invention is to provide a method for accurately tracking the growth of potential preexisting structural flaws.

A further object of the invention is to provide a method for assessing flaw growth potential in structural components.

Still another object of the invention is to provide a crack growth gage having a flaw that may be used to predict the residual life of the structural component to which it is attached.

A still further object of this invention is to provide a preflawed gage that functions as an on-board analog computer, incorporating the effects of both fatigue or service loading or environment on a real time basis, in the prediction of damage accumulation in a structural component.

Other objects and advantages of the invention can be obtained by referring to the ensuing disclosure and the drawing, in which.

SUMMARY OF THE INVENTION

Broadly speaking, the present invention resides in a method for assessing damage accumulation in a structural component which comprises attaching a preflawed gage to the component and relating the growth of the gage flaw to a real or assumed flaw in the component.

In a more specific embodiment, the method comprises the steps of attaching a gage in the form of a fatigued metal strip having a flaw therein of predetermined length to a structural component having a flaw therein of a length greater than the length of any other flaw therein and lesser than the gage flaw, monitoring the growth of the gage flaw; and determining from that growth the growth of the flaw in the component.

In another embodiment, the present invention lies in a crack growth gage for assessing flaw growth potential in a structural component. The gage comprises a fatigued metal strip having a crack or flaw therein having a length greater than the length of the maximum length flaw in the structural component.

In recent years materials research has been directed toward providing a technology base which would permit an estimation of damage accumulation or crack growth in materials subjected to cyclic loadings. The specific goal of some of these efforts was to develop a procedure or device which would allow damage accumulation to be monitored on an aircraft-to-aircraft basis or more hopefully on a component-to-component basis. In general, these programs have been unsuccessful because the methods and/or instruments developed were incapable of measuring parameters which could be directly related to the complex processes which influence the growth of a flaw or crack. The method and device of this invention differ from these past endeavors in that a known flaw or crack of critical length formed in a fatigued metal gage is employed to monitor the growth of another or suspected flaw. As a result, the complex mechanisms that are operative in the growth of the unknown flaw affect the growth of the known flaw in the gage. As described in detail hereinafter, it has been discovered that a mathematical relationship exists between the two flaw sizes that permits an accurate determination of the unknown flaw size. Furthermore, the relationship existing between the flaw sizes can be determined empirically, a procedure which substantiates the mathematical relationship.

Figure 1:
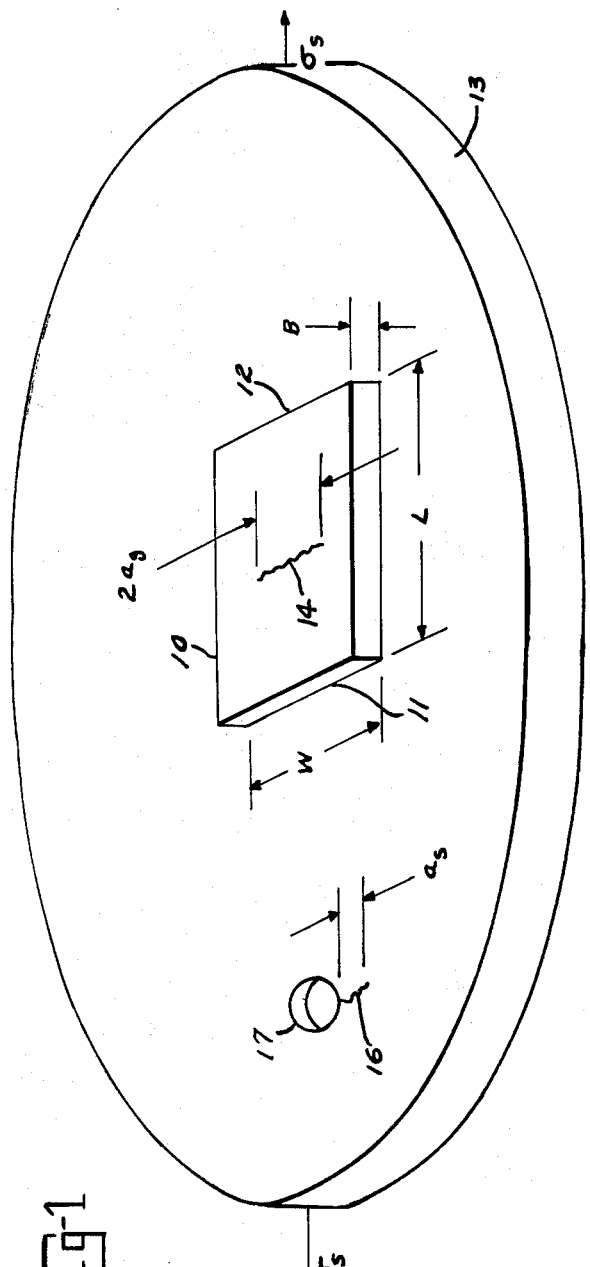
FIG. 1 is a schematic view of the crack growth gage of this invention attached to a flawed structural component.

A more comprehensive understanding of the invention can be obtained by referring to the drawing. In FIG. 1, there is shown a crack growth gage 10 whose ends 11 and 12 are attached to structural component so that its underneath side between the ends is in unobstructed contact with the component. The ends of the gage can be secured to the structural component by any suitable means, e.g., by means of an adhesive, by welding, or by means of bolts or rivets. As illustrated, the gage is in the form of a rectangular metal strip whose width, length and thickness are designated by the lettes W, L and B, respectively. Flaw or crack 14 in the gage is positioned substantially in the center of the metal strip, and its length is indicated to be $2a_g$. (The subscripts "g" and "s" are used herein to refer to gage or structure quantities). It is to be understood that it is not necessary for the gage flow to be positioned in the center of the metal strip. For example, the flaw may be an edge crack, i.e., one extending inwardly from a side of the metal strip. As another example, the crack may extend from a hole drilled in the metal strip.

Structural component 13 is depicted as having a flaw or crack 16 emanating from hole 17. As previously mentioned, the flaws of greatest significance in aircraft structural components are those associated with fastener holes. In accordance with MIL SPEC-A 83444, the U.S. Air Force requires the establishment of an assumed initial flaw size in all fracture critical components. Furthermore, in subsequent maintenance inspections, there is a requirement to find and measure the size of structural flaws. As illustrated, flaw 16 has an assumed initial flaw size $a_s$ or a size $a_s$ of the flaw with the maximum measured size.

The gage is preferably formed of a material having the same composition and thermomechanical processing as the structural component to which it is attached. However, the two materials need not be the same as, for example, in the case of a metallic gage used on a resin matrix composite. In general, the thickness of the gage is less than the thickness of the component to which it is attached. The gage usually has a thickness that ranges from about 0.003 to 1.5 inches. For example, a gage having a 3 mil thickness is suitable for use with a structural component having a 5 mil thickness while a 1.5 inch thick gage is suitable for use with a 2 inch thick component. The gage preferably has a rectangular shape with a width to length ratio of about 5 to 1 to 0.2 to 1. However, it is within the scope of the invention to use various other geometric shapes, the only requirement being that the geometric shape parameter for use in a fracture mechanics stress intensity factor calculation be known.

The gage is positioned on the structural component so that the flaw or crack is substantially normal to the axis of stress to which the component is subjected. As shown in FIG. 1, the direction of structural stress $\sigma_s$ is indicated by the arrows. The flaw or crack is formed in the gage by initially cutting a narrow, e.g., about 1 to 2 mils wide, slit in the metal strip, the length of the slit being less than the final desired size. The gage is then fatigued with a fatigue loading test machine, e.g., with an MTS machine, until the slit has grown to desired crack length. The size of the initial crack size is critical in determining the growth of the structural flaw. If the initial size of the gage flaw is too small, the flaw may grow slowly relative to the structural flaw and thus be insensitive to structural flaw growth. Also, it may grow rapidly relative to the structural flaw growth so that the gage will be useful only over a small structural flaw size range. However, as initimated by the latter statement it is often desirable where structural flaws are very small and any minute growth is important as in jet engine compressor discs to use a gage flaw size that is large as compared to the initial structure flaw size. In general, the initial gage flaw size is larger than the assumed or measured structure flaw size. The ratio of gage flaw size to structure flaw size usually ranges from about 1.1 to 200 and more often from about 1.1 to 5.

The gage crack-structural crack size relationship is established by cross-correlating the crack growth behavior between the two crack geometries. This cross-correlation is established to remove the measure of time (or fatigue cycle count) used to express the crack size-life curve for each flaw geometry. The following equation provides the basic equality used in the development of this gage crack size-structural crack size relationship:

$$F = F_g = F_s, \tag{1}$$

where $F$ is a number which expresses the measure of service related time or flights, loading blocks, cycles, and the like. It is noted that the value of F is the same at selected locations in the structure ($F_s$) and in the gage ($F_g$).

The cross-correlation of crack lengths using equation (1) can be based on crack-life curves that are established either by experiment or by analysis. A general analysis scheme is based on the following equation:

$$F = \int_{a_{og}}^{a_g} \frac{da}{f_g(\overline{K}_g)} = \int_{a_{os}}^{a_s} \frac{da}{f_s(\overline{K}_s)}. \tag{2}$$

In equation (2), the $\overline{K}$ quantity is a stress intensity factor value that describes the effect of geometry and loading on crack growth rate behavior; $a_{og}$ and $a_{os}$ are the initial gage and structural crack sizes, respectively; and the function $f$ relates the stress intensity factor $\overline{K}$ to the crack growth rate behavior. The stress intensity factor ($\overline{K}$) must be established for the gage and structure, and normally $f_g(\overline{K}_g)$ will not be equal to $f_s(\overline{K}_s)$. Analysis schemes based on relationships other than equation (2)

are possible and are directly derivable from equation (1).

An example of how equation (2) may be solved is presented hereinafter. An empirical crack growth relationship of the form represented by the following equation is assumed:

$$da/dF = D(K_{max})^m. \quad (3)$$

In equation (3), $D$ and $m$ are material and stress history related constants, $a$ is crack size, and F and K are as indicated hereinbefore. From equation (3), the relationship represented by the following equation is obtained:

$$\frac{D_g}{D_s} \int_{a_{os}}^{a_s} \frac{da}{(\beta_s \sqrt{\pi a})^m} = \quad (4)$$

$$\int_{a_{og}}^{a_g} \frac{da}{\{\frac{E_g}{E_s}[\frac{L}{L + \frac{2(1-\alpha^2)}{W}\int_0^a a\beta_g da}]\sqrt{\pi a}\}^m}$$

The details of the development of equation (4) are disclosed by us in "Proceedings of Fourth International Conference on Fracture", (April 1977), D. Taplin, Editor, University of Waterloo, Waterloo, Canada, and in Air Force Materials Laboratory Technical Report AFML-TR-76-174 (October 1976) (available through NTIS, AD No. ADA033574). In equation (4), $\beta$ refers to the geometric stress intensity factor coefficients, $E$ is Young's modulus of elasticity, $L$ is the gage length, $W$ is the gage width, $\alpha$ is Poisson's ratio for the gage material and $a$ is crack size. The subscripts "g" and "s" in the formula refer to gage and structure, respectively. The values for $\beta$ and $K$ in the foregoing equations can be found in "The Stress Analysis Crack Handbook" by Hiroski Tada, Del Research Corp., Hallertown, Pa., or in "Handbook of Stress and Intensity Factor" by G. S. Sih, Institute of Fracture and Solid Mechanics, Lehigh University, Bethlehem, Pa. The values for $m$ and $D$ can be found in "Damage Tolerant Design Handbook (Part 1)" (Sept. 1973), Battelle, Columbus Laboratories, Columbus, Ohio 43201. The values for constants E and $\alpha$ can also be found in any standard mechanical engineer's handbook.

By solving equation (4) numerically, $a_s$ is generated as a function of $a_g$. In performing this solution, a numerical integration scheme is employed. Firstly, the integration of the right-hand side of the equation is carried out with the trapezoidal rule together with Romberg's extrapolation method. The upper bound of the absolute error for this procedure is specified to be less than $1 \times 10^{-5}$. Secondly, an upper limit for the left-hand side of the equation is chosen and the integration performed as before. Depending on the agreement of the left-hand value with the previously determined right-hand side, an adjustment is made in the upper limit ($a_s$) of the left integral and the procedure is repeated until the value of the two integrals agree to within 0.02 percent.

Since equation (4) is independent of stress history, the $a_s$ versus $a_g$ response is likewise independent of stress history. Also, the presence of constants $D_g$ and $D_s$ in equation (4) permits the use of two different materials for the gage and structure if the constant $m$ for both materials is approximately equal. The constants also make it possible to account for variability in material properties if the same metal is used in both structure and gage.

A more comprehensive understanding of the invention, including the relationship between gage and structural flaw lengths, can be obtained by referring to the examples that are described hereinafter.

EXAMPLE I

Figure 2:
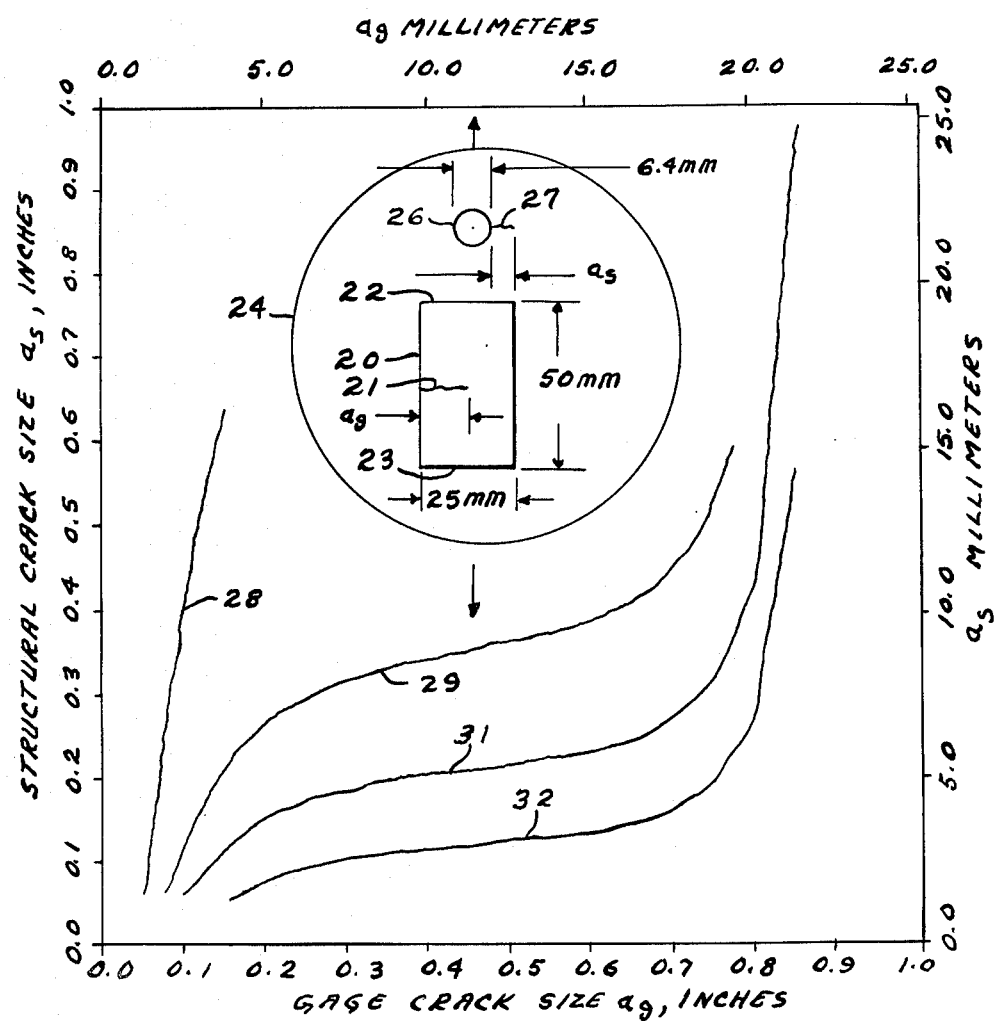
FIG. 2 illustrates graphically analytical results showing the effect of the initial gage flaw size on a typical gage-structural crack growth relationship.

Following the numerical procedure described above, the relation between gage and structural flaw lengths was found for the geometric configuration shown in FIG. 2.

As shown in FIG. 2, gage 20 in the form of a steel coupon has a length of 50 mm and a width of 25 mm. The gage has an edge crack 21 of a length designated as $a_g$. The ends 22 and 23 of the gage are attached to a large steel plate 24 containing a 6.4 mm radially cracked hole 26. The length of radial crack 27 is designated as $a_s$. Prior to attachment to the plate by means of bolts (not shown), gage 20 is fatigued in a fatigue load test machine to the desired initial flaw size.

Equation (4) above was solved for various initial gage flaw sizes, i.e., $a_{og} = $ 1.3, 1.9, 2.5 and 3.8 mm. In solving the equation, $m$ equalled 4, a constant amplitude fatigue crack growth rate exponent typical of many structural materials. Poisson's ratio $\alpha$ equalled 0.333, and since the gage and the structure are of the same material, $D_g$ equalled $D_s$. The assumed initial structure flaw size $a_{os}$ was 1.3 mm for each of the gage flaw sizes. The results of the solutions for each initial gage flaw size are shown graphically in FIG. 2, i.e., curve 28 for $a_{og} = $ 1.3 mm, curve 29 for $a_{og} = $ 1.9 mm, curve 31 for $a_{og} = $ 2.5 mm, and curve 32 for $a_{og} = $ 3.8 mm.

The results obtained as indicated by the curves show a strong dependence on initial gage crack size, varying from a high structural crack to gage crack growth ratio (curve 28 where $a_{og} = a_{os} = $ 1.3 mm) to a response where gage crack growth significantly amplifies corresponding extension of the structural flaw (curve 32 where $a_{og} = $ 3.8 mm and $a_{os} = $ 1.3 mm). Thus, by varying the initial gage crack size, there is provided a means for designing a gage for various degrees of amplification of structural crack growth. The results obtained also show that the ratio of gage crack size to structure crack size is critical. As seen from the slope of curve 28, when this ratio is 1, there is a large structure crack growth with only a small change in gage crack growth. Thus, a gage crack size to structure crack size ratio of 1 is unsatisfactory primarily because of the difficulty in monitoring such a small change in gage crack size. For the particular geometric configuration shown, a gage crack size to structure crack size ratio of about 1.5 (curve 29) gives the most satisfactory degree of amplification of structure crack growth. However, in some cases where a large change in gage crack growth with only a small change in structure crack growth is desired, a ratio of about 3 (curve 32) can be used with advantage.

EXAMPLE II

Figure 3:
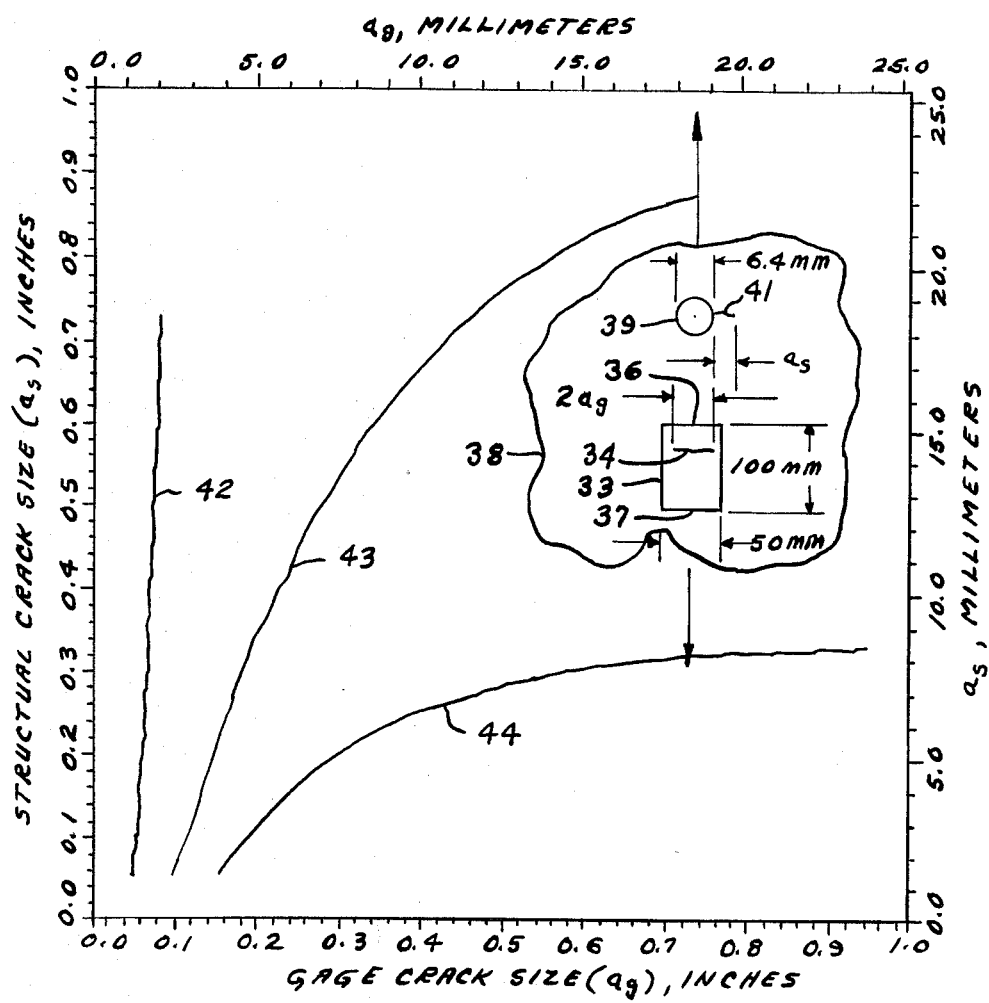
FIG. 3 illustrates graphically an analytical prediction of a crack growth at a hole as a function of crack size in a center cracked gage.

The same procedure described in Example I was followed in determining the relation between gage and structure flaw lengths for the geometric configuration shown in FIG. 3.

As depicted in FIG. 3, gage 33 in the form of a steel coupon has a length of 100 mm and a width of 50 mm. The gage has a center crack 34 of a length designated as $2a_g$. The ends 36 and 37 of the gage are attached by bolts (not shown) to a large steel plate 38 containing a 6.4 mm radially cracked hole 39. The length of radial crack 41 is designated as $a_s$. The gage is fatigued in a fatigue load test machine to the desired flaw size prior to attachment to the plate.

Equation (4) above was solved for initial gage flaw sizes of 1.3 mm, 2.5 mm and 3.8 mm while the assumed initial structure flaw size was 1.3 mm. As in Example I, in solving the equation, $m$ equalled 4, Poisson's ratio equalled 0.333, and $D_g$ equalled $D_s$. The results of the solutions for each initial gage flaw size are shown graphically in FIG. 3, i.e., curve 42 for $a_{og}$ = 1.3 mm, curve 43 for $a_{og}$ = 2.5 mm, and curve 44 for $a_{og}$ = 3.8 mm.

The results obtained as indicated by the curves demonstrate, as in Example I, the effect of initial gage crack size on the sensitivity of structure crack growth. Thus, when $a_{og} = a_{os}$ = 1.3 mm (curve 42), the gage crack is insensitive to structure crack growth. On the other hand, when $a_{og}$ = 3.8 mm and $a_{os}$ = 1.3 mm (curve 44), the gage crack is highly sensitive to structure crack growth. However, for an initial gage flaw size of 2.5 mm (curve 43), the gage demonstrates growth characteristics which permit it to be usable over a wide range of flaw sizes in the structure, i.e., between 1.3 mm and 23 mm.

EXAMPLE III

Figure 4:
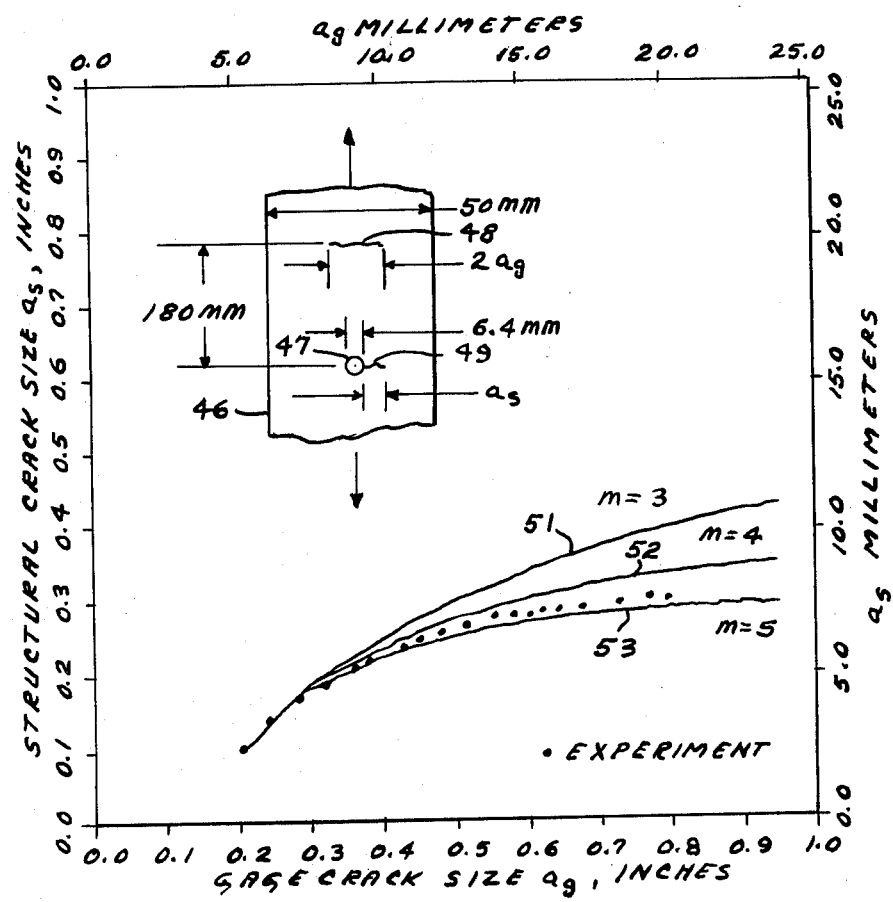
FIG. 4 shows graphically a comparison of experimental data with the analytical prediction for the relationship between two different flaw geometries in the same specimen.

Referring to FIG. 4, there is shown a long specimen 46 of 7075-T651 aluminum having a width of 150 mm and a thickness of 12.7 mm. The specimen contains a radially cracked hole 47 having a diameter of 6.4 mm and in series therewith a center crack 48. Radial crack 49 has a length designated as $a_s$ while the length of center crack 48 is designated as $2a_g$. The interval between the center of hole 47 and center crack 48 is 180 mm.

Specimens as shown in FIG. 4 as described above were subjected to complex variable amplitude loading representative of an aircraft stress history. Measurements of gage crack size $a_g$ and corresponding structural crack size $a_s$ were made and plotted as shown by the black dots.

Equation (4) above was solved for an initial gage flaw size $a_{og}$ of 5.0 mm and an initial structural flaw size $a_{os}$ of 2.5 mm. Since the crack growth exponent $m$ was unknown, computations were made for $m$ equals 3, 4 and 5. Poisson's ratio equalled 0.333 and $D_g$ equalled $D_s$. The results obtained in the solutions of equation (4) above for the different values of $m$ are shown by curves 51, 52 and 53.

From the foregoing, it is seen that there is excellent agreement between the experimental and analytical results, a condition that verifies the validity of the essential factors of equation (4). It is noted that the numerical calculations required no knowledge of the actual load history applied to the test specimen.

Figure 5:
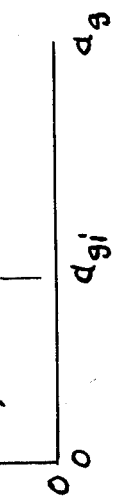
FIG. 5 is a schematic representation of the relationship between gage and structural flaw sizes.

Referring now to FIG. 5, there is illustrated a typical curve 54 showing the relationship between gage crack size and structure crack size. The subscript "i" when used in conjunction with $a_g$ and $a_s$ indicate current gage or structural flaw sizes. For example, at a particular time, number of cycles, flights, etc., the length of the gage crack is $a_{gi}$ and the length of the structure crack is $a_{si}$. Curve 54 can be generated either analytically as described above or experimentally as will be described subsequently.

Figure 6:
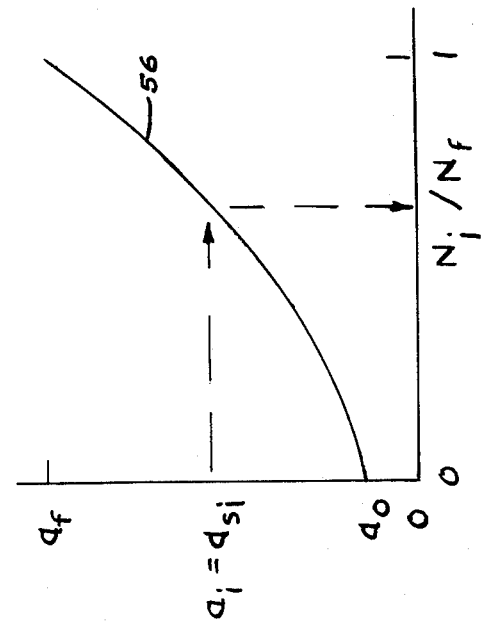
FIG. 6 shows a normalized crack growth (NCG) curve used to assess life capability used up.

Reference is now made to FIG. 6 which shows what is termed a normalized crack growth (NCG) curve 56. The NCG curve expresses structural crack growth behavior in the structure of FIG. 5 as a function of the expended life ratio $(N_i/N_f)$. The symbols $N_i$ and $N_f$ correspond, respectively, to the current and final number of flights, cycles, loading blocks, etc. On the basis of curve 56 alone, when the ratio is equal to 1, it is an indication that maintenance action is required. Curve 56 shown in FIG. 6 is of the type currently being used in tracking programs and is derived using either experimental or analytical structure crack size-life curves. Knowledge of current structural crack lengths $a_{si}$ as defined by the measured gage crack length $a_{gi}$, as shown in FIG. 5, allows one to predict from curve 56, as indicated by the arrows in FIG. 6, the flights, cycles, loading block, etc., remaining before maintenance action is required. The result may be a longer or shorter life than that determined solely by curve 56 of FIG. 6. Using this procedure the residual life of the component can be forecast.

The description hereinabove has been primarily concerned with the analytical procedure followed in determining the relationship existing between gage crack size and structure crack size. Thus, it has been demonstrated that when the initial gage crack size is greater than an initial or current assumed or measured structural crack size, the growth of the gage crack is a direct indication or measure of the growth of the structural crack. Since the gage is attached to the structure, it undergoes the same conditions of fatigue or service loading and environment as the structural component. As a result these variables are automatically taken into consideration, and damage accumulation in the structural component can be tracked by simply following the gage flaw growth.

The relationship existing between gage crack size and structure crack size can also be determined experimentally. In this procedure, the structural component is inspected and any flaws therein are located and measured. A flaw in a "hot spot" or area of maximum stress is then selected for use in the determination of gage flaw size. A gage in the form of a metal strip of the same metal as the structure has a short, thin slit cut therein after which it is fatigue loaded in a test machine until the slit has about the same length as the structural flaw. The ends of the gage are next attached by bolts to the structure near the hot spot with the gage flaw normal to the direction of maximum stress to be encountered by the structure. The structure is then subjected to a predetermined and set load spectra. At the end of each cycle, the lengths of the gage flaw and specimen flaw are measured. The foregoing procedure is repeated for identical structural components but using initial gage flaw sizes ($a_{og}$) that are greater than structural flaw sizes ($a_{os}$). The values obtained are plotted to give $a_g - a_s$ curves for several initial gage crack sizes. The initial gage crack size can be selected that will give the desired degree of amplification of structural crack growth.

The fatigue gage of this invention relates gage flaw growth to the growth of a structural flaw of assumed or measured length. This relationship is independent of time and automatically takes into account the various variables that account for flaw growth. However, for the relationship to be meaningful, the length of the gage flaw is critical. Thus, the ratio of gage flaw length to structure flaw length must be greater than 1. The advantages accruing from using the gage to track damage accumulation in structural components are further enhanced by the fact that it can be placed in an accessible location and used to track flaw growth in locations that are expensive and difficult to inspect.

While the use of the crack growth gage of this invention has been described primarily with relation to aircraft structural components, it can be used on any component that experiences loading in service and in which natural or manufacturing flaws could grow to critical sizes and cause failure while in use. For example, the gage and method of this invention are applicable for use in assessing damage accumulation in jet engine components, ground vehicles, bridges, pipelines, nuclear reactor components, and the like.

As will be evident to those skilled in the art, modifications of the present invention can be made in view of the foregoing disclosure without departing from the spirit and scope of the invention.

We claim:

1. A method for assessing damage accumulation in a structural component which comprises the steps of attaching to the component a gage having a flaw therein of predetermined initial length; and relating growth of the gage flaw to growth of a flaw of assumed or measured length in the component, the gage flaw having an initial length greater than the initial length of the component flaw.

2. A method for assessing damage accumulation in a structural component which comprises the steps of attaching a gage in the form of a fatigued metal strip having a flaw therein of a predetermined initial length to the structural component having a flaw therein of an initial length greater than the length of any other flaw therein and lesser than the initial length of the gage flaw; monitoring gage flaw growth as the structural component undergoes conditions of stress; and determining from the growth of the gage flaw the growth of the flaw in the structural component.

3. The method according to claim 2 in which the gage is attached to the structural component so that its flaw is substantially normal to the axis of stress to which the component is subjected.

4. The method according to claim 3 in which the flaw in the metal strip is formed by initially cutting therein a narrow slit having a length less than the initial length of the structural flaw and then fatiguing the metal strip until the initial length of its flaw is greater than the initial length of the structural flaw.

5. The method according to claim 4 in which the metal strip is fatigued until the ratio of its initial flaw size to initial structural flaw size ranges from about 1.1 to 200.

6. The method according to claim 4 in which the metal strip is fatigued until the ratio of its initial flaw size to initial structural flaw size ranges from about 1.1 to 5.

7. The combination of a crack growth gage attached to a structural component for assessing damage accumulation in the structural component comprising a fatigued metal strip having a flaw therein of a predetermined initial length greater than an assumed or measured length of a flaw in the structural component; and means for attaching ends of the metal strip to the structural component with its underside between the attaching means in unobstructed contact with the structural component.

8. The crack growth gage according to claim 7 in which the metal strip is in the shape of a rectangle having a width to length ratio of about 5 to 1 to 0.2 to 1 and the thickness of the metal strip ranges from about 0.003 to 1.5 inches.

9. The crack growth gage according to claim 8 in which the flaw in the metal strip extends inwardly from a side of the metal strip.

10. The crack growth gage according to claim 8 in which the flaw is disposed in about the center of the metal strip.

11. The crack growth gage according to claim 8 in which the ratio of gage flaw size to structure flaw size ranges from about 1.1 to 200.

12. The crack growth gage according to claim 8 in which the ratio of gage flaw size to structure flaw size ranges from about 1.1 to 5.

* * * * *